United States Patent [19]

DiFrank et al.

[11] Patent Number: 5,660,610
[45] Date of Patent: Aug. 26, 1997

[54] REMOTELY ADJUSTABLE GLASS FEEDER NEEDLE ASSEMBLY

[75] Inventors: Frank J. DiFrank; John M. Slifco, both of Toledo, Ohio; Francis R. Morrison, Dubois, Pa.

[73] Assignee: Owens-Brockway Glass Container Inc., Toledo, Ohio

[21] Appl. No.: 328,176

[22] Filed: Oct. 24, 1994

[51] Int. Cl.$^6$ ........................... C03B 7/00
[52] U.S. Cl. ............... 65/158; 65/160; 65/164; 65/324; 65/325; 65/328; 65/330
[58] Field of Search ............... 65/129, 158, 160, 65/324, 325, 328, 330, 66, 164

[56] References Cited

U.S. PATENT DOCUMENTS

| | | | |
|---|---|---|---|
| 1,529,948 | 3/1925 | Freese | 65/328 |
| 1,792,932 | 2/1931 | Rule | 65/328 |
| 1,816,275 | 7/1931 | Algeo et al. | 65/328 |
| 1,926,764 | 9/1933 | Dorman | 65/328 |
| 2,669,805 | 2/1954 | Rowe | 65/328 |
| 2,725,681 | 12/1955 | Wythe | 65/328 |
| 3,516,812 | 6/1970 | Donnelly et al. | 65/327 |
| 3,711,266 | 1/1973 | Daly | 65/328 |
| 4,013,439 | 3/1977 | Vlk | 65/330 |
| 4,478,631 | 10/1984 | Mumford | 65/328 X |
| 4,551,163 | 11/1985 | Duga et al. | 65/129 |
| 4,554,000 | 11/1985 | Suomala et al. | 65/129 |
| 4,581,054 | 4/1986 | Mumford | 65/328 |
| 4,581,055 | 4/1986 | Bratton | 65/328 |
| 4,682,998 | 7/1987 | Ayala-Ortiz | 65/164 |
| 4,708,729 | 11/1987 | Gardenas-Franco et al. | 65/164 |
| 5,266,093 | 11/1993 | Konishi et al. | 65/158 |

*Primary Examiner*—Milton Cano

[57] ABSTRACT

A needle assembly (30) for controlling the flow of molten glass from a feeder bowl (76) through one or more orifices (84) in an orifice plate (86) beneath the feeder bowl. The needle assembly includes a vertical needle (32) for each orifice and each needle is precisely adjustable along its vertical axis by a stepper motor (34). The stepper motor for each needle is positioned remotely from the needle and drives the needle through a potentiometer (72) and a linkage mechanism (36). Each linkage mechanism includes a generally horizontally extending member (38), a vertically extending member (40), and a bevel gear drive (88) to permit the generally horizontally extending ember to drive the vertically extending member. The rotation of the potentiometer is a measure of the travel of the needle, and sends a signal of the position of the needle to an operator at the level of the forming machine floor, who can, when necessary, actuate a stepper motor to adjust the position of the needle without the need to leave the forming machine floor.

26 Claims, 12 Drawing Sheets

FIG. 19

REMOTELY ADJUSTABLE GLASS FEEDER NEEDLE ASSEMBLY

FIELD OF THE INVENTION

This invention relates to a needle assembly for use with a feeder for feeding molten glass to a glass forming machine. More particularly, this invention relates to a needle assembly of the foregoing type in which the position of the needle relative to the orifice of the feeder bowl that incorporates such needle may be adjusted, to control glass flow rate through the orifice, by a machine operator on the forming machine floor, without the need to climb to the level of the feeder bowl to determine the position of the needle or to change its position.

BACKGROUND OF THE INVENTION

In the manufacture of glass containers by a process that is often referred to as the flow process, molten glass flows through an orifice at the bottom of a feeder bowl, which is located at the outlet end of a molten glass conditioning forehearth, to a glass forming machine positioned beneath the feeder. In such an arrangement the feeder bowl is at an elevation which is substantially above the elevation of the floor on which the forming machine is positioned beneath the feeder bowl. The rate of flow of molten glass through the orifice of the feeder bowl must be closely controlled to control the weight of the containers being formed by the underlying forming machine, and such control is accomplished by controlling the position of a vertical elongate member, called a needle, relative to the fixed position of the feeder bowl orifice. Typically, in conventional glass container manufacturing operations each feeder bowl will have two or more flow orifices, and each such orifice will be provided with a needle whose position relative to its flow orifice during the flow process must be controlled independently of the positions of the other needles associated with the same feeder bowl. Further, it is customary to provide a mechanism for intermittently retracting each needle from its feeder bowl orifice to suspend flow through the orifice when a shearing mechanism positioned between the feeder bowl orifice and the forming machine is operating to shear the glass stream flowing from the orifice into a series of gobs, each of which is to be formed into a container by the forming machine.

The adjustment of needles in feeder bowls of the type described above, independently of the reciprocation of the needle as required to coordinate feeder bowl operation with shear mechanism operation, typically requires that a glass forming machine operator climb to the level of the feeder bowl, an area where the temperature will often inherently be uncomfortably high, to make a mechanical adjustment in the position of one or more of the feeder needles. Following this, the operator must return to the forming machine floor to weigh freshly formed containers to determine if any further adjustment in the needle position is required, and to return to the level of the feeder to make a further adjustment in the position of one or more of the needles if any of the containers are still not within applicable weight specifications, and to repeat this process until all containers are within weight specifications. Clearly, this is a tedious and unpleasant way to maintain suitable control over glass container weight, and its time-consuming nature precludes the making of needle position adjustments in as timely a manner, or as frequently, as is desirable.

Various glass melting bowl needle assemblies according to the prior art are disclosed in U.S. Pat. No. 4,581,055 (Bratton), U.S. Pat. No. 4,554,000 (Suomala et al.), and U.S. Pat. No. 4,682,998 (Ayala-Ortiz), the disclosure of each of which is incorporated by reference herein.

BRIEF DESCRIPTION OF THE INVENTION

In accordance with the present invention there is provided a needle assembly for a glass feeder bowl in which the position of each needle, within the limits of its travel and relative to the feeder bowl orifice with which it is associated, can be determined, and adjusted if and when necessary, by a forming machine operator without the need for the operator to climb to an elevation above the level of the forming machine floor. The needle adjustment mechanism of the needle assembly of this invention incorporates an electrical stepper motor for each needle to permit adjustment of the position of the needle in small steps of a predetermined magnitude for precise control of the needle position and the weight of the glass containers being formed from the glass stream that flows through the feeder bowl orifice with which the needle is associated. A pneumatic lock mechanism is provided to lock the needle in position after its adjustment to a proper position has been made, and the needle lock mechanism can be actuated by an operator at the level of the forming machine floor when it is necessary to make a further adjustment in the position of the needle.

In the preferred embodiment of the present invention the needle adjustment motors are located at the elevation of the needle adjustment mechanisms, but at a substantial distance from the needle adjustment mechanisms and therefore away from the damaging effects of the high temperatures that are prevalent in the region of the needle adjustment mechanisms to permit the motor to operate the adjustment mechanism, a novel gear box/drive shaft/needle screw connection linkage mechanism being provided between each motor and the associated needle to transmit motion of the motor to the needle. A potentiometer or other position sensing device is drivably connected to the stepper motor that drives the adjusting drive shaft to determine the relative circumferential orientation of the adjusting drive shaft, an indication of the position of the needle within the limits of its adjustment range and relative to its orifice, and to transmit a signal to a control panel on the forming machine floor to provide such information to the operator. Further, the needle adjustment assembly of the present invention can be readily disassembled and reassembled to permit rapid change of the needles and the associated feeder bowl tube through which the needles pass, and this is important in a glass container forming operation because of the need to replace all needles and tubes every several days.

A needle assembly according to the present invention lends itself quite readily to manual control of bottle weight, where the forming machine operator makes a manual adjustment of the needle position, after weighing freshly formed containers, to correct an out of weight condition in the containers. This is the preferred mode of practicing the invention in conjunction with a glass forming machine of the blow and blow type, and can also be used with a glass forming machine of the press and blow type. Alternatively, with a glass forming machine of the press and blow type, it is contemplated that the needle assembly of the present invention can be adapted to automatic weight control by using a signal from the forming machine plunger press as an indication of glass gob weight.

Accordingly, it is an object of the present invention to provide an improved glass feeder needle assembly. More particularly, it is an object of the present invention to provide a needle assembly in which the position of each needle relative to the orifice of the glass feeder bowl with which it is associated can be detected, and changed when necessary, at locations remote from the feeder bowl, for example, by a forming machine operator without the requirement that the operator climb to the level of the feeder bowl to do For a further understanding of the present invention and the objects thereof, attention is directed to the drawing and to the following brief description thereof, to the detailed description of the preferred embodiment of the invention and to the appended claims.

DETAILED DESCRIPTION OF THE PREFERRED EMBODIMENT

A glass melter needle assembly according to the preferred embodiment of the present invention is indicated generally by reference numeral 30, and comprises three like needles 32, though a greater or lesser number of such needles may be used in a given glass melter installation. Each needle 32 controls the rate of flow through an orifice of a glass melter bowl, as will hereinafter be described more fully, and is capable of being raised and lowered in small, precise increments independently of the other needles 32 by an electrical stepper motor 34. Each stepper motor 34 is positioned well away from the location of the needles 32, to avoid the damaging effects of the high temperature environment that will inherently exist in the region proximate to the location of the needles 32, as will hereinafter be explained more fully. To transmit raising and lowering torque to each needle 32 from its associated stepper motor 34, a linkage mechanism 36, comprising a generally horizontally extending member 38 and a vertically extending member 40, is provided. The electrical connections to the stepper motor 34 are by way of a roll-action feed harness 42, because the assembly 30 must be continuously reciprocated relative to a glass shearing mechanism, not shown, which is positioned below the needle assembly 30 and above a glass forming machine, also not shown, to interrupt the flow of glass to the shearing mechanism during its shearing cycle.

The needles 32, which are continuously immersed in molten glass, as will be hereinafter explained more fully, are constructed of a temperature resistant refractory material. Nevertheless, the needles 32 are subject to wear during their normal life cycle, which typically will be approximately ten days in continuous operation. This wear must be compensated for by the repositioning of each needle to maintain a predetermined glass flow rate through its associated melter orifice, as the weight of the container being formed from the glass stream flowing through such orifice is a function of the glass flow rate. Thus, a weigh station, not shown, is positioned near the container forming machine, to permit the forming machine operator to periodically weigh freshly formed glass containers to determine if they are within applicable weight specifications. Alternatively, freshly formed glass containers can be automatically weighed as they exit the glass forming machine, and it is contemplated that such a system would be beneficial in conjunction with the application of the present invention to glass forming machines of the press and blow type.

Figure 1:
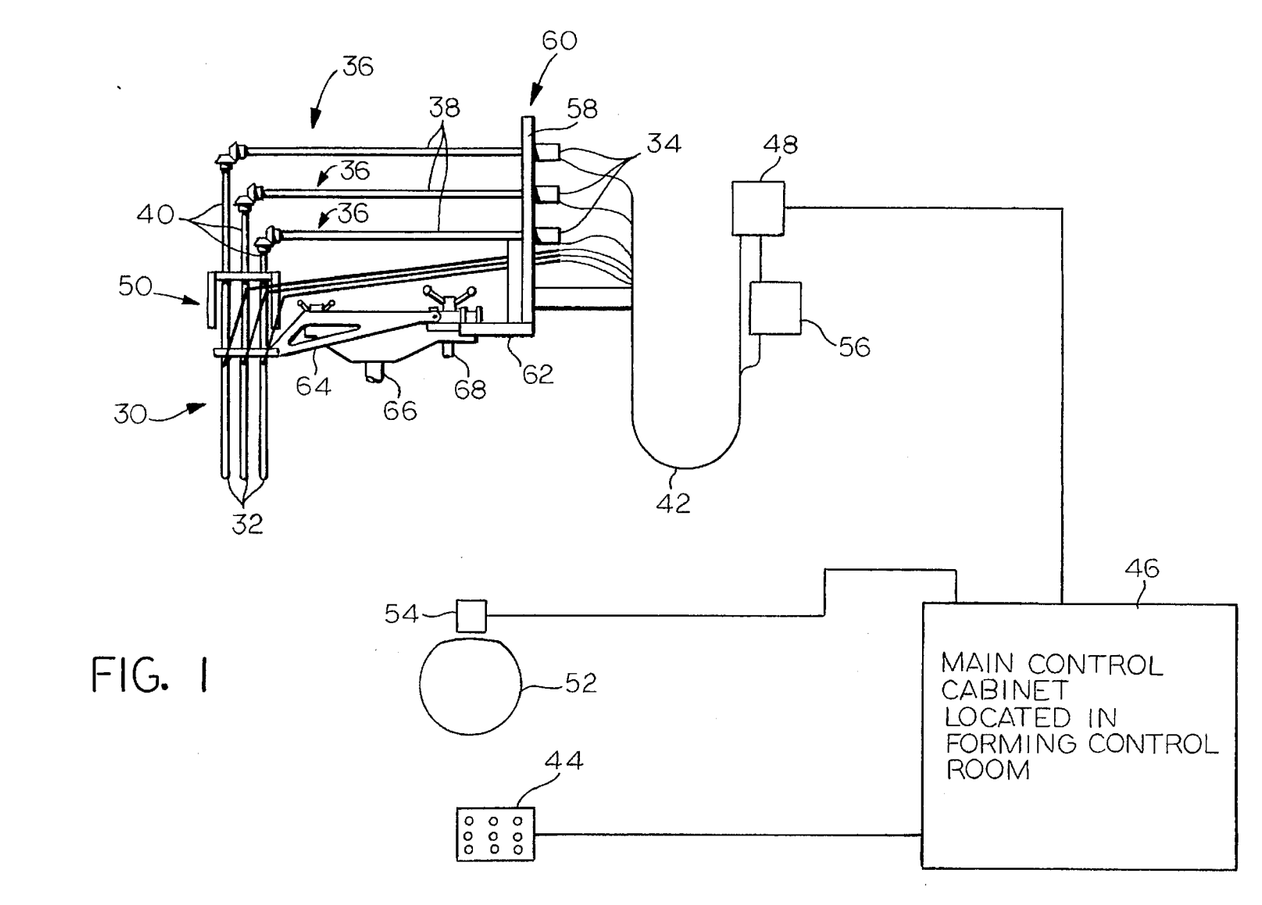
FIG. 1 is a schematic view of a glass feeder assembly according to the preferred embodiment of the present invention.

In connection with non-automated applications of the present invention, such as those intended for glass forming operations of the blow and blow type, a push button operator's control station 44 is positioned near the forming machine weigh station, to permit the operator to initiate an adjustment in the position of the needle 32 that controls the rate of glass flow through the orifice from which the out of specification container was formed. A control signal from the operator's control station 44 is transmitted to an electronic control cabinet 46, which is typically located in a control room on the forming machine floor. The control cabinet 46 controls the flow of electricity to a lock cylinder solenoid 48, after which a time delay begins to allow the needle position lock mechanism, which is indicated generally by reference numeral 50 in FIG. 1, to move to its unlocked position. A junction box 56 is provided between the control cabinet 46 and the stepper motor 34 to provide simple cable replacement with the use of quick disconnects.

A timing cam 52, which is used to coordinate the timing of the reciprocation of the needle assembly 30 with the operation of its associated shearing device, is provided with a position sensor 54 to detect the proper position of the needle assembly 30 in its reciprocation cycle at which the needle lock mechanism 50 can be returned to its lock position. Upon completion of the time delay the control cabinet 46 then controls the flow of electricity to the associated stepper motor 34 permitting it to make an adjustment in the position of its associated needle 32.

Figure 2:
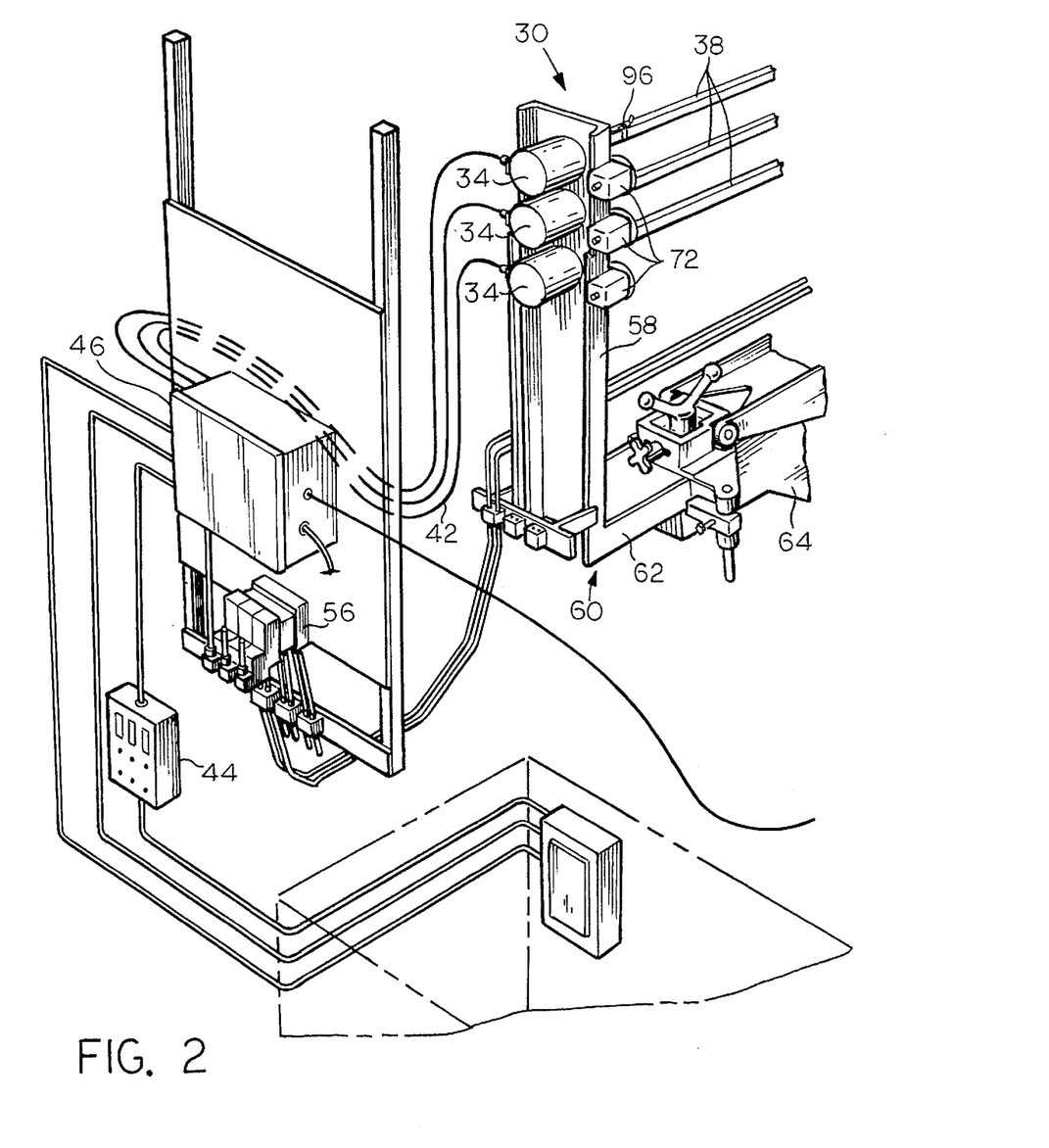
FIG. 2 is a fragmentary perspective view, at an enlarged scale, of a portion of the glass feeder assembly of FIG. 1.
Figure 3:
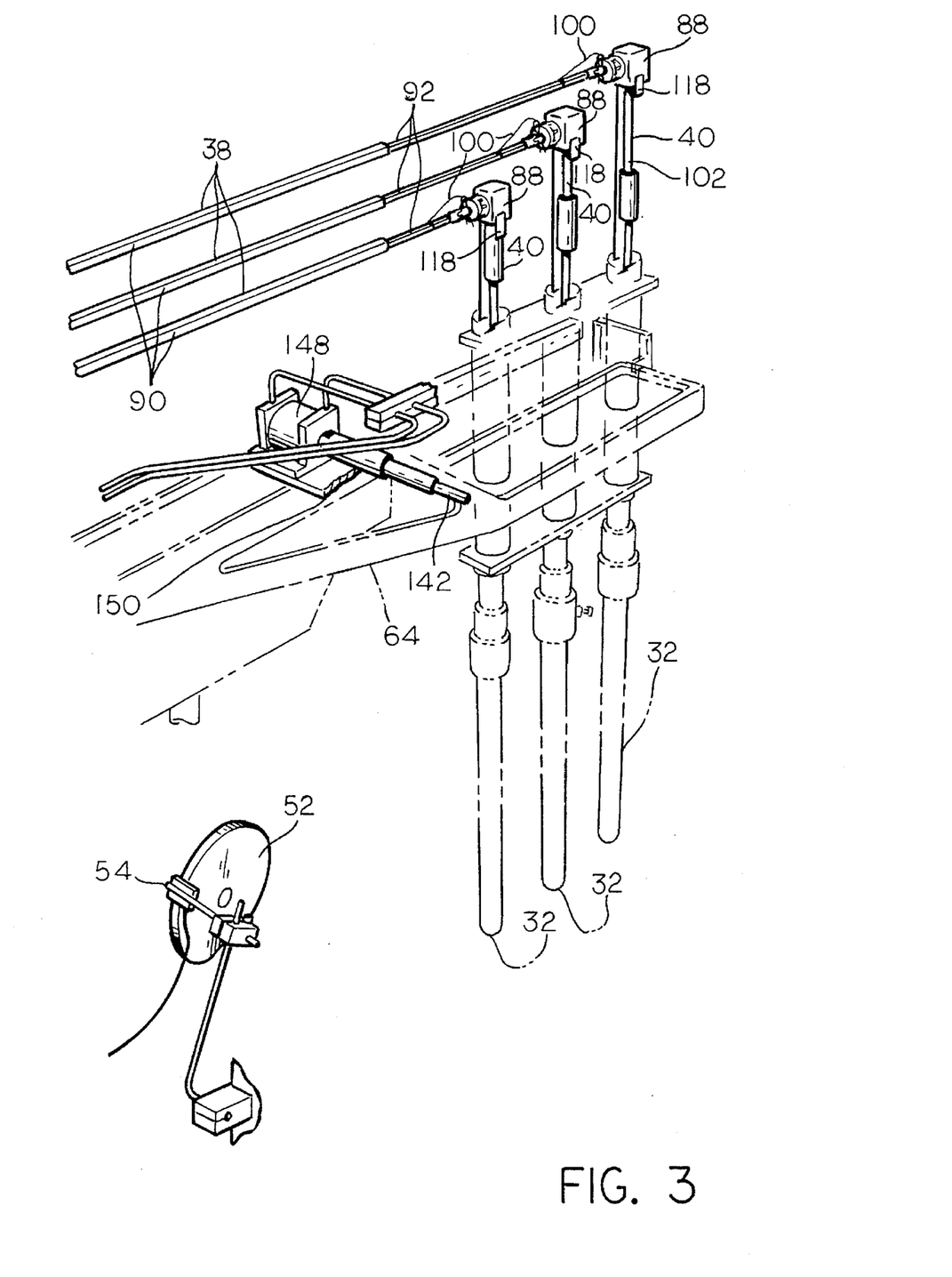
FIG. 3 is a fragmentary perspective view, at an enlarged scale, of another portion of the glass feeder assembly of FIG. 1, some of the structure being shown in phantom.
Figure 19:
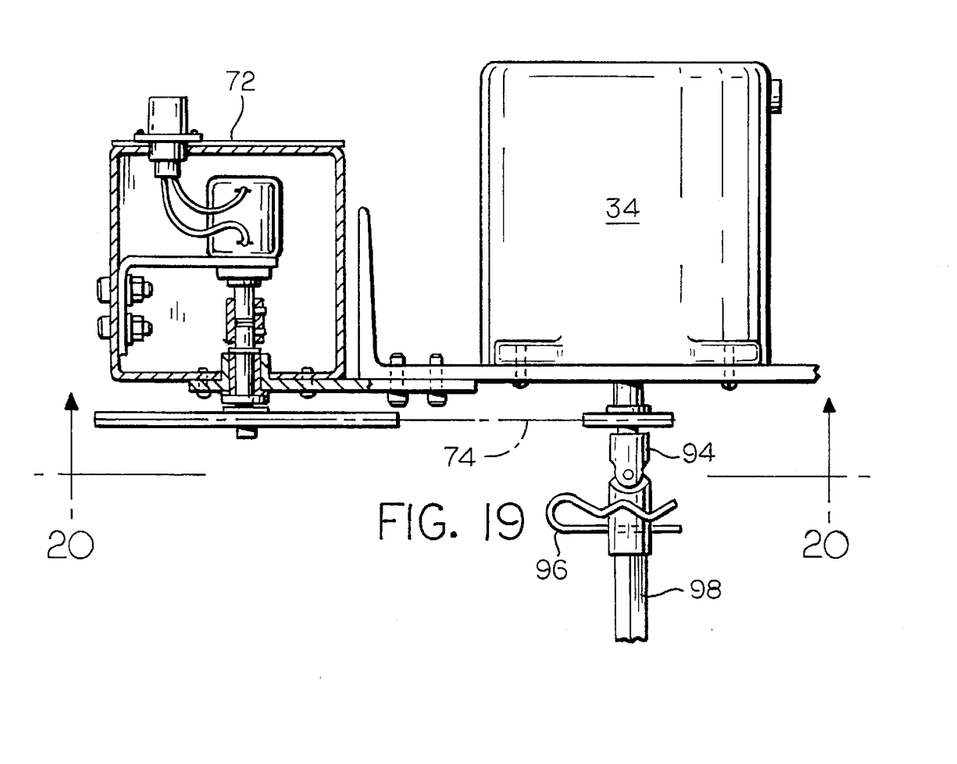
FIG. 19 is an elevational view, partly in cross-section and at an enlarged scale, of a portion of the glass feeder assembly of FIG. 1.
Figure 20:
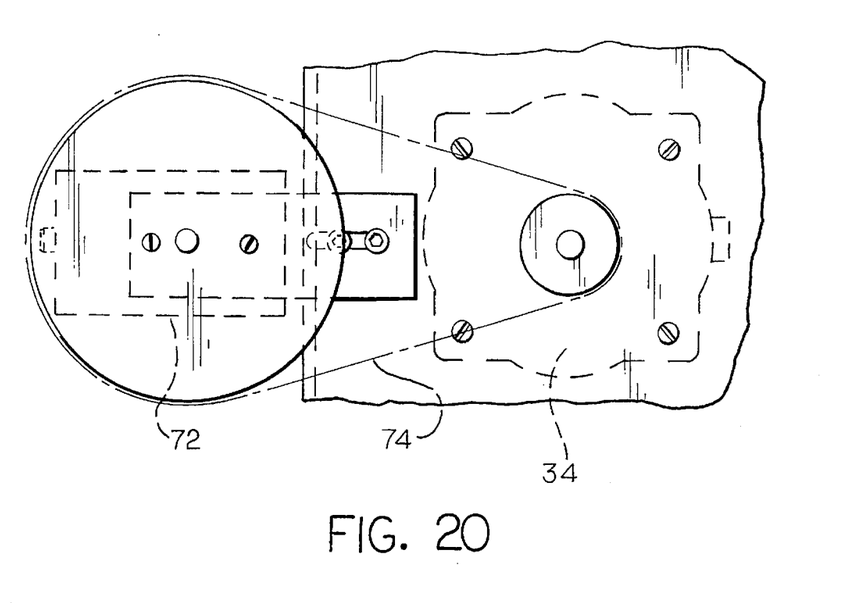
FIG. 20 is a view taken on line 20—20 of FIG. 19.

Each of the stepper motors 34 is mounted on a vertical leg 58 of a generally L-shaped frame 60, the generally horizontal leg 62 of which extends towards the needles 32. The needles 32 are supported from a support member 64 which is removably and adjustably secured to the horizontal leg 62 of the frame 60, and the support member 64 is caused to reciprocate in a vertical plane, and to thereby reciprocate the frame 60, by the vertical rods 66, 68, which extend from the underside of the support member 64 to a reciprocating mechanism, indicated generally by reference numerals 70 in FIG. 5. The relative position of each needle 32 within the limits of its overall stroke, typically a distance of approximately ±1-½ inches (a total of 3 inches), is sensed by a potentiometer 72, which is mounted on the vertical leg 58 of the frame 60 (FIG. 2). The potentiometer 72 is driven by one of the stepper motors 34 through an endless drive 74, the member 38 of the linkage mechanism 36 being directly driven by the stepper motor 34 (FIGS. 19 and 20). The potentiometer 72, thus, produces a variable voltage signal which is indicative of the circumferential position of the horizontal member 38 that is driven through such potentiometer 72, and this voltage signal is transmitted through the feed harness 42 to the control cabinet 46, and from the control cabinet 46 to the control panel 44. An operator can use such needle position indication in conjunction with container weight information to make precise adjustments in the positions of the needles 32, and the use of stepper motors 34 to make such adjustments permits the adjustments to be made in increments as small as ⅛ turn in the output shaft of the stepper motor 34, and in an arrangement where a complete turn in the output shaft of the stepper motor 34 can translate into a position adjustment as small as ¹⁄₁₆ inch in the position of a needle 32.

Figure 4:
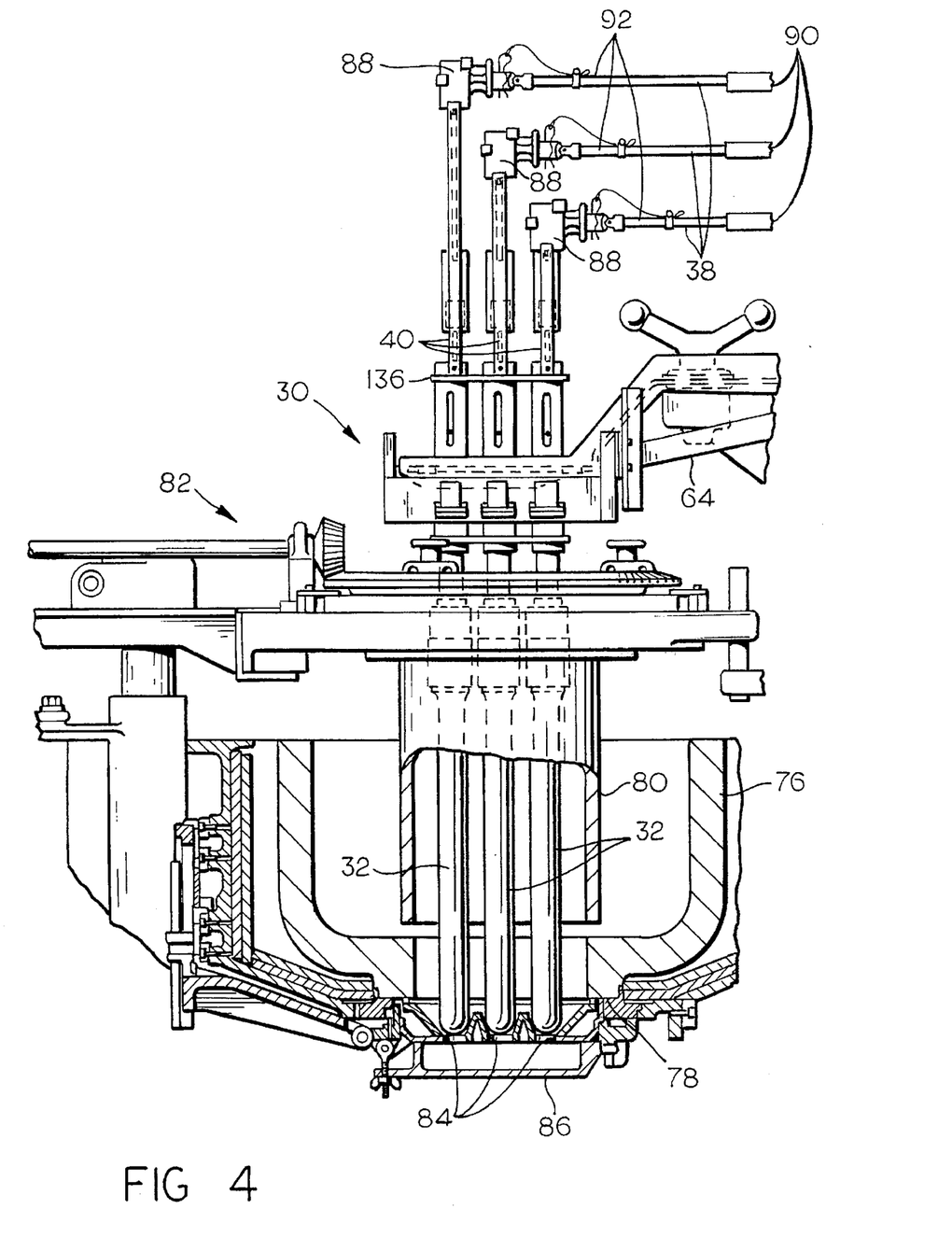
FIG. 4 is an elevational view, partly in cross-section and at an enlarged scale, of a portion of the glass feeder assembly of FIG. 1 in conjunction with a glass feeder bowl with which the feeder assembly is intended to be used.

As is shown, for example, in FIG. 4, the needles 32 of the feeder assembly 30 are used in conjunction with a feeder bowl 76 of a glass melter, otherwise not shown. The feeder bowl 76 is normally positioned at an outlet end of an elongate molten glass conditioning channel, which is usually called a forehearth. The feeder bowl 76 has an opening 78 in the bottom thereof, and a refractory tube 80 extends downwardly into the feeder bowl 76, through the molten glass therein, to nearly the level of the opening 78, the refractory tube 80 being coaxial with the opening 78 and having an inside diameter approximately equal to the maximum dimension of the opening 78. The refractory tube 80 is caused to slowly rotate relative to the feeder bowl 76, to ensure a proper mixing and temperature uniformity of the glass flowing through the opening 78, by a drive mechanism indicated generally by reference numeral 82, which may be of known construction. In any event, each of the needles 32 is positioned on the interior of the refractory tube 80 and is in alignment with an outlet orifice 84 in an orifice plate 86, which is positioned immediately below the opening 78, and each needle 32 thereby serves to limit the rate at which molten glass can flow from the feeder bowl 76 through such outlet orifice 84.

Figures 9, 10, 11:
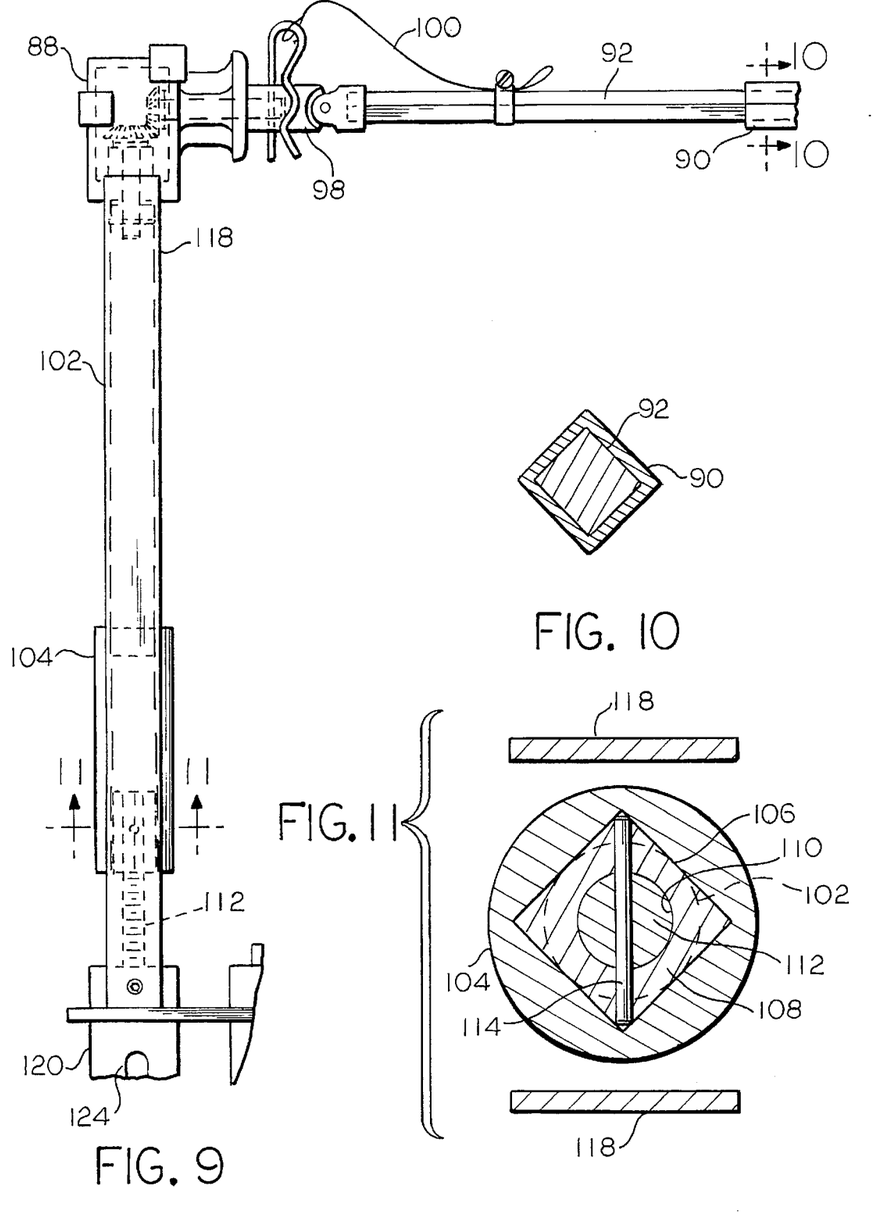
FIG. 9 is a fragmentary elevational view, at an enlarged scale, of a portion of the glass feeder assembly of FIG. 1.
FIG. 10 is a view taken on line 10—10 of FIG. 9.
FIG. 11 is a view taken on line 11—11 of FIG. 9.
Figures 12, 13:
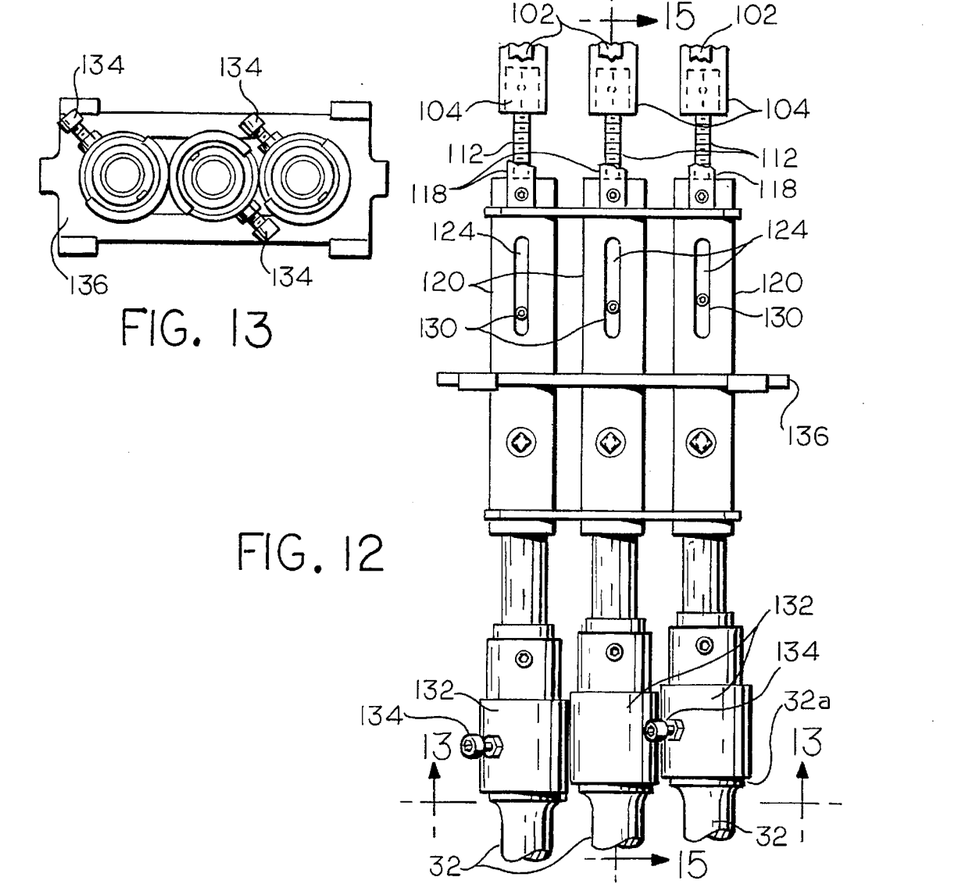
FIG. 12 is a fragmentary elevational view, at an enlarged scale, of a portion of the glass feeder assembly according to the preferred embodiment of the present invention.
FIG. 13 is a sectional view taken on line 13—13 of FIG. 12.
Figure 14:
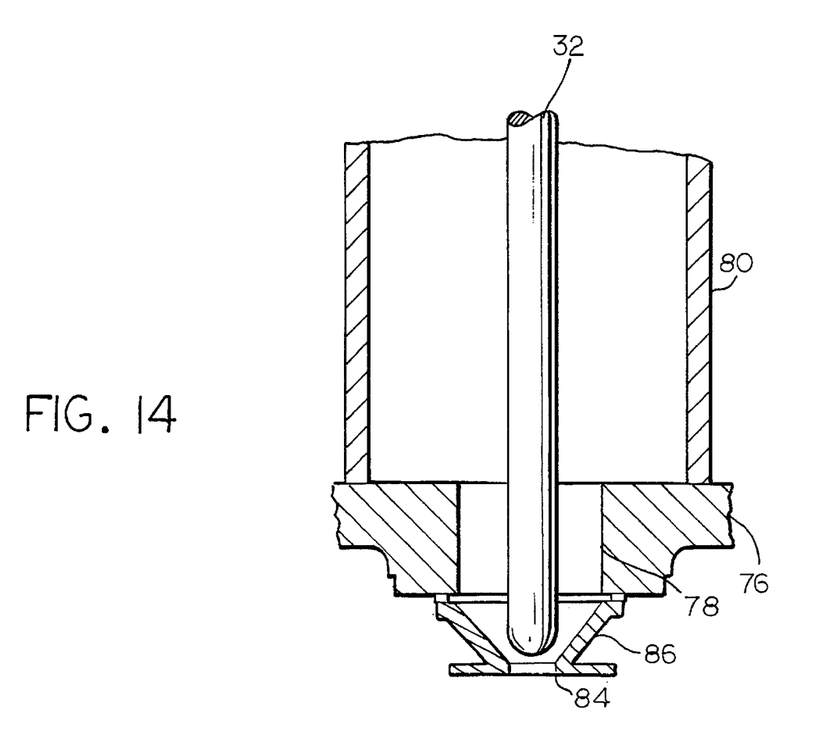
FIG. 14 is a sectional view taken on line 14—14 of FIG. 8.

Each horizontal member 38 of the linkage mechanism 36 drives its associated vertical member 40 through a bevel gear torque transfer device 88. Each horizontal member 38 is of telescopic construction, having an outer annular member 90 connected to the potentiometer 72 and an inner member 92, which is telescopically received in the outer member 90 and is connected to the torque transfer device 88. As is shown in FIG. 10, the interior of the outer member 90 and the exterior of the inner member 92 are of similar non-circular shapes, for example, square shapes, and the inner member 92 fits snugly, but slidably, within the outer member 90 to the inner member 92 with minimum backlash. The connection between the free end of the outer member 90 and the potentiometer 72 is a universal joint 94, the free end of each outer member 90 also being releasably connected to its universal joint 94 by a cotter pin and cable assembly 96 (FIG. 19) for safety reasons, for example, to prevent the outer member 90 from falling into the feeder bowl 76. Similarly, the connection between the free end of each inner member 92 and the torque transfer device 88 to which it is connected as a universal joint 98, the free end of each inner member 92 also being releasably connected to its universal joint 98 by a cotter pin and cable assembly 100 for safety reasons, for example to prevent the inner member 92 from falling into the feeder bowl 76.

Figure 15:
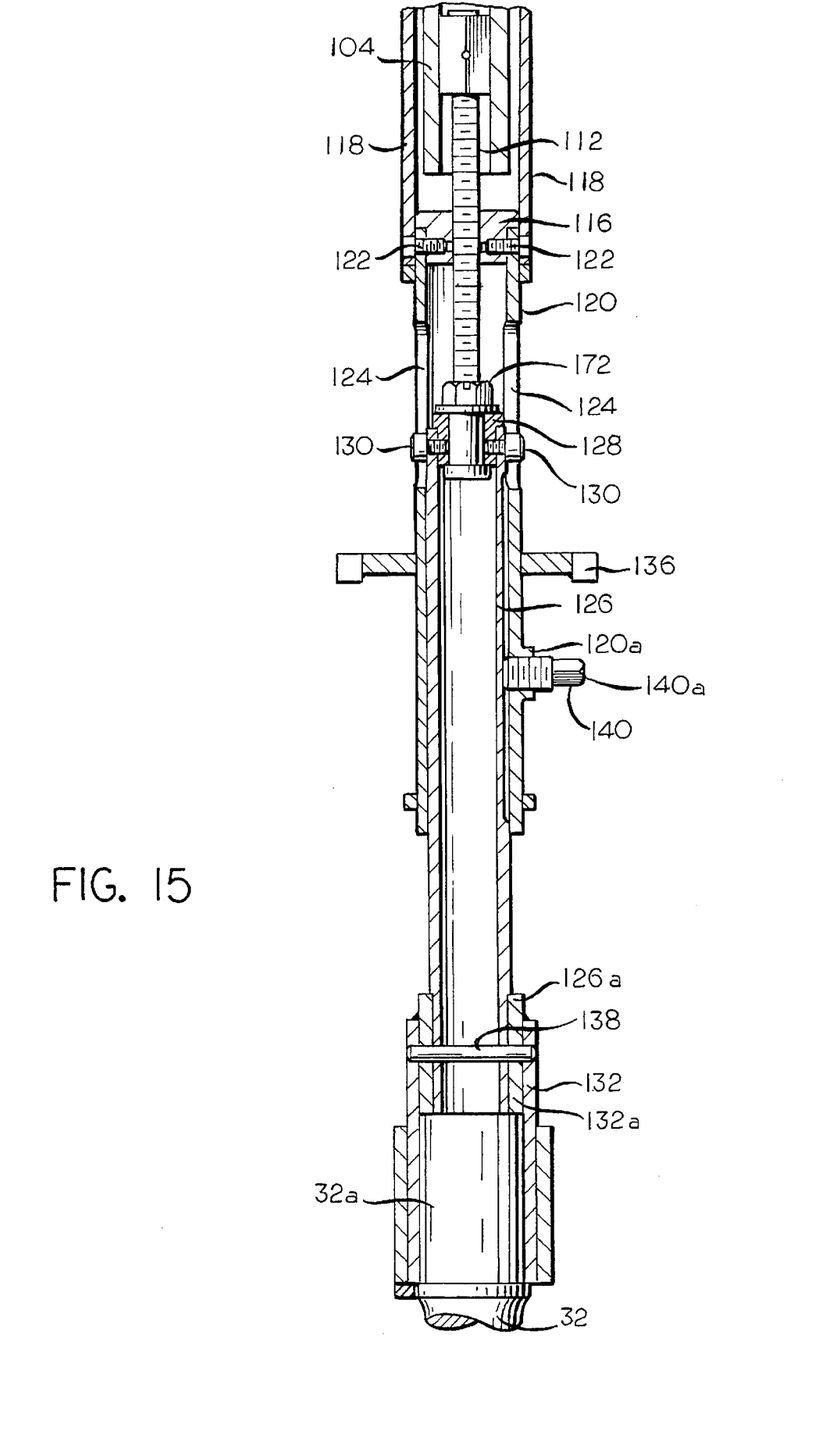
FIG. 15 is a fragmentary elevational view, partly in cross-section and at an enlarged scale, of a portion of the glass feeder assembly according to FIG. 1.

Each vertical member 40 of the linkage mechanism comprises a rod 102 which is rotatably driven by one of the torque transfer devices 88 and extends downwardly therefrom. A lowermost end of the rod 102 is non slidably received in an upper portion of a sleeve 104. The sleeve 104 has a non-circular central opening 106, and an annular member 108 with a similar non-circular exterior is slidably received in the central opening 106 and extends downwardly therefrom (FIGS. 9 and 11). The annular member 108 has a central opening 110 and the upper end of a rod 112 is received in the central opening 110 and is pinned against motion relative to the annular member 108 by a pin 114. A major portion of the rod 112 is threaded and is threadably received in a nut 116 (FIG. 15), which is fixedly suspended from the torque transfer device 88 by a spaced apart pair of plates 118. Thus, rotation of the rod 112 will cause the sleeve 126 to rise or fall relative to the plates 118.

The nut 116 has an outer sleeve 120 suspended therefrom, the outer sleeve being fixed to the nut 116 by a pair or set screws 22 and having an opposed pair of vertical slots 124 therein. An inner sleeve 126 is slidably positioned within the outer sleeve 120, and the inner sleeve 126 has an annular member 128 secured to its upper end by an opposed pair of cap screws 130. The free end of the cap screws 130 extend through the slots 124, and the opposed ends of the slots 124, thus, serve as upper and lower limits on the travel of the inner sleeve 126 within the outer sleeve 120.

The movement of the inner sleeve 126 within the outer sleeve 120 is actuated by the rotation of the rod 112, the lowermost threaded portion of which is threadably received in a nut 172 which is affixed to the annular member 128. The inner sleeve 124 has an annular extension. 132 affixed to its lowermost extremity, and the extension 132 receives an enlarged end portion 32a of the needle 32 therein, the end portion 32a engaging an annular shoulder portion 132a of the annular extension 132 to fix the position of the needle 32 relative to the inner sleeve 126. The needle 32 is removably secured in position with respect to the annular extension 132 by a set screw 134 which extends through the annular extension 132 to engage the enlarged end portion 32a of the sleeve, and the assembly of each of the vertical members 40 is stabilized by a retainer plate 136 which engages the exterior of each of the outer sleeves 120. The extension 32 is removably secured to the free end of the inner sleeve 126 by a pin 138, which extends through aligned apertures in the annular extension 132 and the inner sleeve 126, respectively. This permits a needle 32 an extension 132 to be preassembled for rapid assembly to the inner sleeve 126 when it is desired to replace a needle. Further, the inner sleeve 126 is provided with a radial shoulder 126a which will engage the free end of the extension 132 when the apertures that receive the pin 138 are in vertical alignment.

Figure 5:
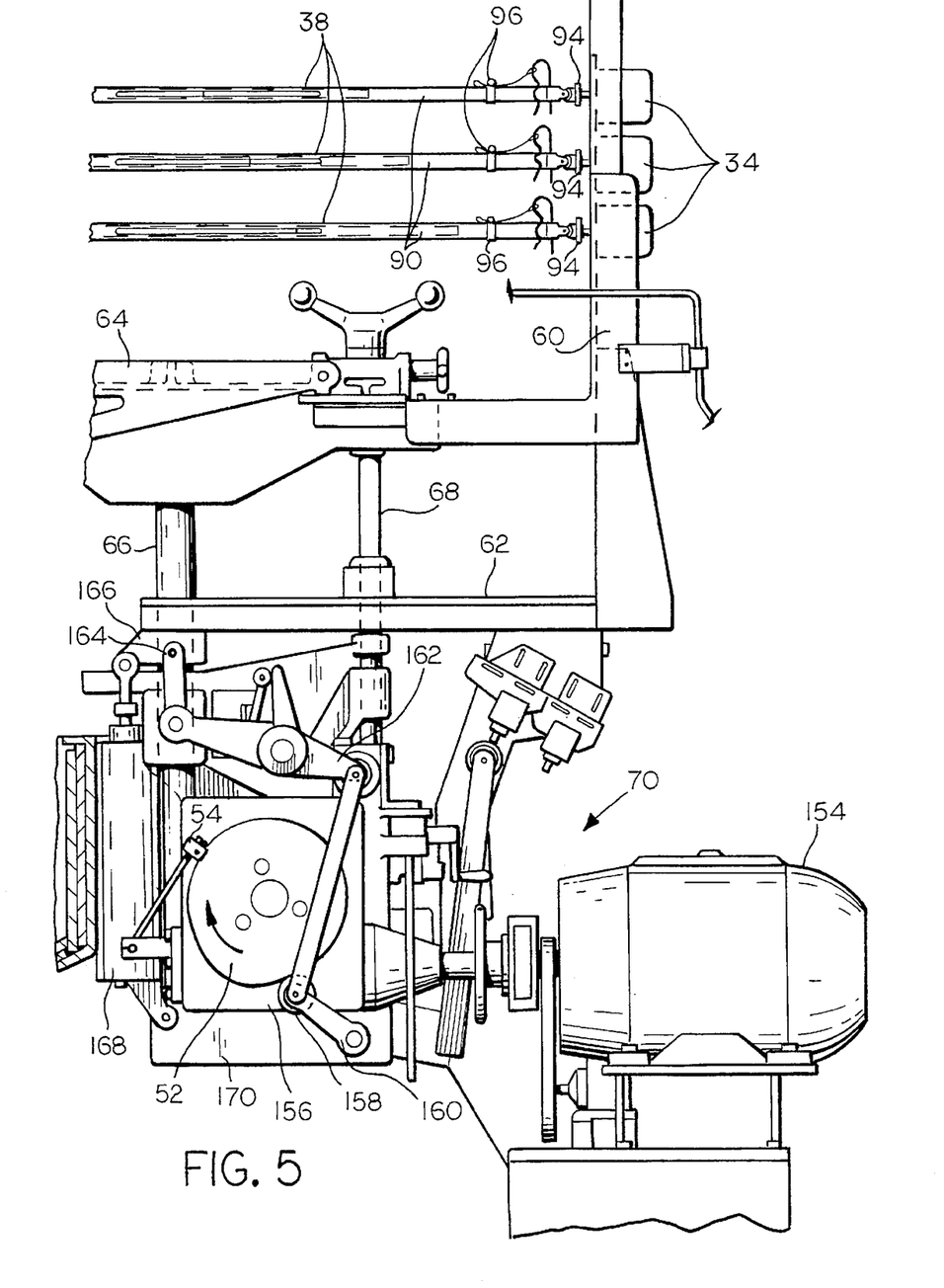
FIG. 5 is a fragmentary elevational view of a portion of the glass feeder assembly of the preferred embodiment of the present invention.
Figure 6:
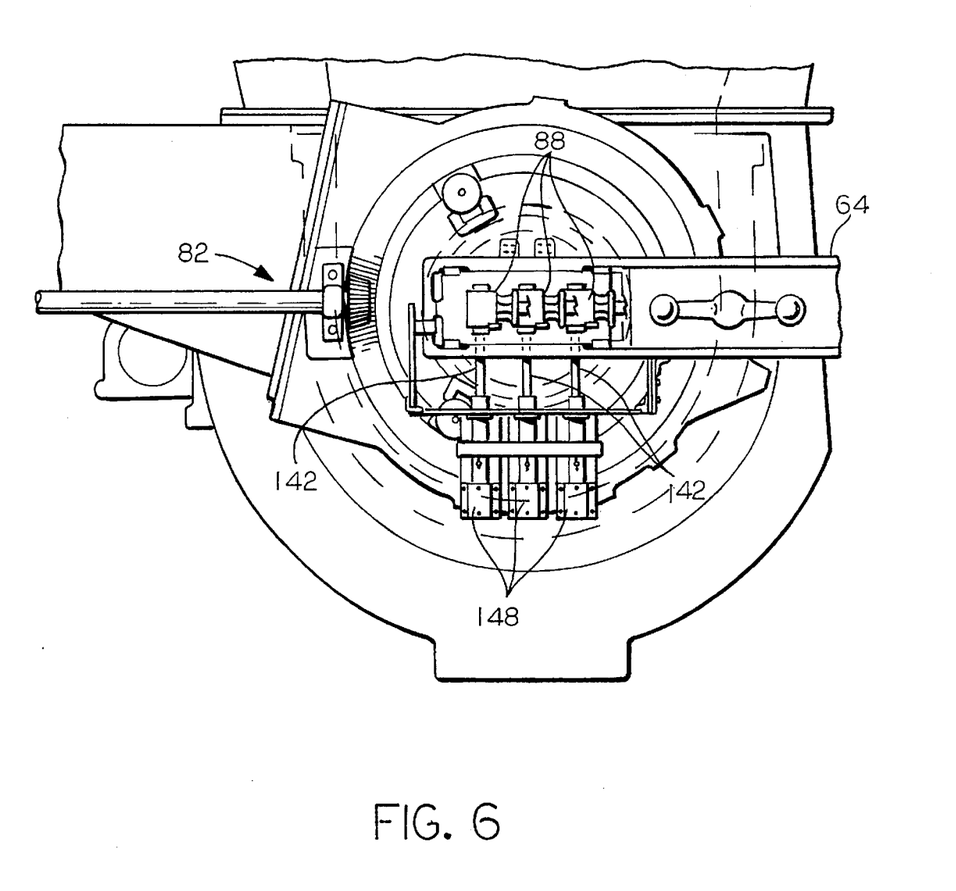
FIG. 6 is a fragmentary planned view of a portion of the glass feeder assembly according to the preferred embodiment of the present invention.
Figure 7:
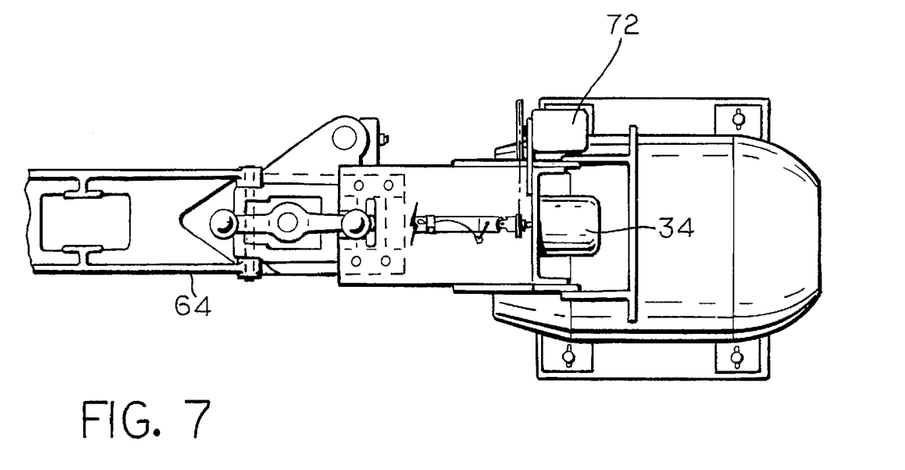
FIG. 7 is a fragmentary planned view of a portion of the glass feeder assembly according to the preferred embodiment of the present invention.
Figure 8:
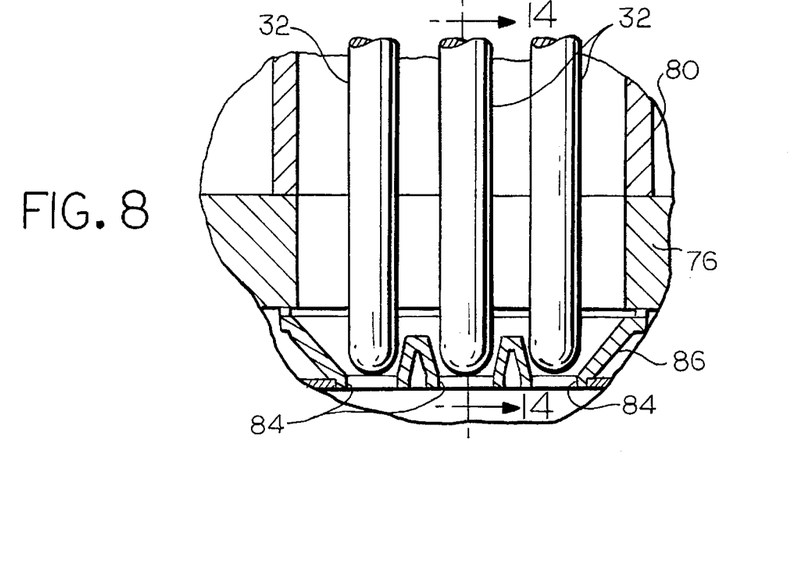
FIG. 8 is a fragmentary elevational view of a portion of the glass feeder assembly according to the preferred embodiment of the present invention in conjunction with a glass feeder bowl with which the feeder assembly is intended to be used.
Figures 16, 17, 18:
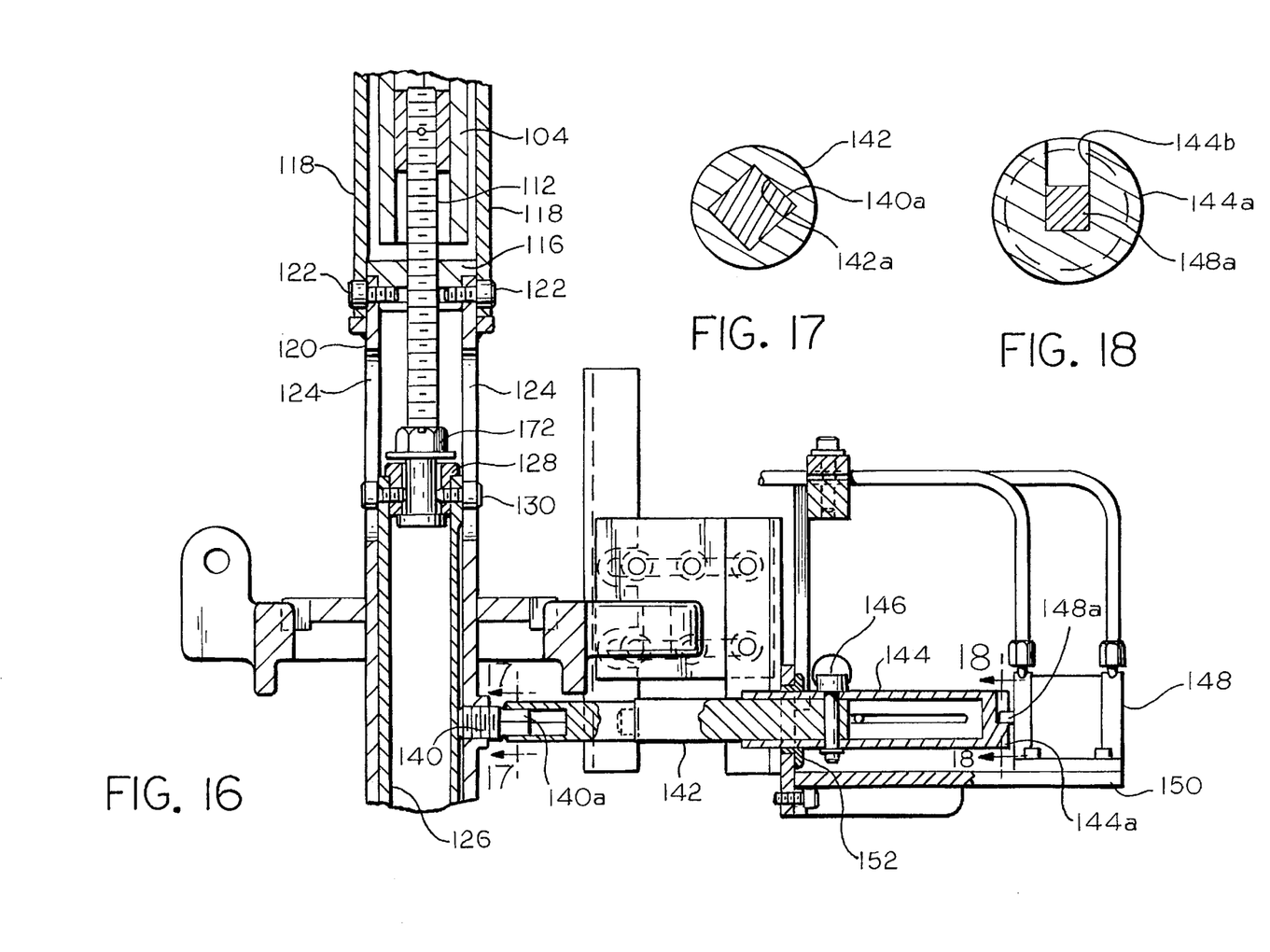
FIG. 16 is a fragmentary elevational view, partly in cross-section and at an enlarged scale, taken at right angles to the view of FIG. 15.
FIG. 17 is cross-sectional view taken on line 17—17 of FIG. 16.
FIG. 18 is a cross-sectional view taken on line 18—18 of FIG. 16.

The position of the inner sleeve 126 with respect to the outer sleeve 120 is releasably locked in place when it is not desired to adjust the position of the needle 32 with respect to its orifice 84 by a set screw 140, which is threadably received in a boss 120a of the outer sleeve 120 to engage the inner sleeve 126. The set screw 140 has a head 140a, which is square or otherwise non-circular in cross-section, and the head 140a is received in a similarly shaped opening 142a in an end of an elongate member 142 (FIGS. 16 and 17). The opposed end of the elongate member 142 is slidably received in an annular member 144, and the elongate member and the annular member 144 are releasably joined to one another by a pin 146, which passes through aligned openings in the annular member 144 and the elongate member 142. The annular member 144 has a closed opposed end 144a, and the closed end 144a has a generally radial slot 144b extending partly thereto along the longitudinal central axis of the annular member 144. The generally radial slot 144b of the annular member receives an output shaft 148a of a pneumatic or hydraulic rotary motor 148, which is mounted on a fixed support structure 150, which incorporates a bearing 152 to rotatably support the annular member 144, and the output shaft 148a is of square, or other non-circular shape (FIG. 18), to impart rotary motion to the annular member 144, and thereby to the elongate member 142 and the set screw 140, when the motor 148 is driven. Thus, by controlling the operator of the motor 148, for example, by a push button at the control panel 44, it is possible to selectively lock or unlock the position of the inner sleeve 126 with respect to the outer sleeve 120, so that an adjustment in such position can not inadvertently occur at an improper time during the reciprocation of the needle assembly by the reciprocating mechanism 70 (FIG. 5).

The operation of the reciprocating mechanism 70 is powered by an electrical motor 154 which operates a conventional variable speed reducer 156 to rotate the timing cam 52. A cam follower 158 at the end of a pivoted link 160 is biased against the exterior of the timing cam 52, and the motion which is imparted to the cam follower 158 by the rotation of the timing cam 52 is imparted to an end of a rocker arm 162, which is pivoted about an axis between its opposed ends. The rocking motion of the rocker arm 162, in turn, acts to reciprocate the L-shaped frame 60 through a link 164, an end of which is pivotally joined to an opposed end of the rocker arm 162. The opposed end of the link 164 is pivotally connected to a boss 166 on the underside of the horizontal leg 62 of the L-shaped frame 60. The reciprocating motion of the L-shaped frame 60, as heretofore described, is cushioned by a pneumatic or hydraulic cylinder 168, the rod end of the cylinder 168 being pivotally connected to the boss 166 and the piston end of the cylinder 168 being pivotally connected to a fixed frame member 170.

Although the best mode contemplated by the inventors for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. In an apparatus for feeding molten glass to a subjacent forming machine, the apparatus comprising a feeder bowl having an orifice at a level which will permit molten glass to flow by gravity therethrough, the improvement including a needle assembly comprising:

a generally vertically extending elongate needle in alignment with an orifice of a feeder bowl, the needle being movable between first and second positions along a longitudinal central axis relative to the orifice to control the rate of flow of molten glass through the orifice;

means operable at a second location remote from the position of and movably connected to said needle for adjusting the position of said needle between said first and second positions;

linkage mechanism means mechanically connected to said needle and said adjusting means for transmitting motion from said adjusting means to said needle, movable in a circumferential direction; and means drivably connected to said adjusting means for detecting the position of said needle between said first and second positions relative to the circumferential motion of said linkage mechanism means and for indicating the position of said needle at a first location remote from the position of said needle, so that adjustments to the positions of said needle is carried out from said first location.

2. The apparatus according to claim 1 wherein said means for adjusting comprises an electrical stepper motor.

3. The apparatus according to claim 2 wherein said electrical stepper motor is positioned remotely from said needle, and further comprising:

linkage mechanism means for transmitting motion from said electrical stepper motor to said needle.

4. The apparatus according to claim 3 wherein said linkage mechanism comprises:

a generally horizontally extending member.

5. The apparatus according to claim 1 wherein the second location remote from the position of said needle in a location accessible by a forming machine operator without the need to climb above the level of the forming machine.

6. In an apparatus for feeding molten glass to a subjacent forming machine, the apparatus comprising a feeder bowl having an orifice at a level which will permit molten glass to flow by gravity therethrough, the improvement including a needle assembly comprising:

a generally vertically extending elongate needle in alignment with an orifice of a feeder bowl, the needle being movable between first and second positions along a longitudinal central axis relative to the orifice to control the rate of flow of molten glass through the orifice;

means operable at a location remote from the position of said needle for adjusting the position of said needle between said first and second positions, said means for adjusting comprises an electrical stepper motor;

linkage mechanism means mechanically connected to said needle and said stepper motor for transmitting motion from said electrical stepper motor to said needle, said linkage mechanism means comprises a generally horizontally extending member, movable in a circumferential direction; and means drivably connected to said stepper motor for detecting the position of said needle between said first and second positions relative to the circumferential motion of said linkage mechanism means and for indicating the position of said needle at a location remote from the position of said needle, said detecting means comprising a potentiometer for detecting the circumferential position of said generally extending member.

7. The apparatus assembly according to claim 6 wherein said generally horizontally extending member is connected to said potentiometer, and further comprising:

endless drive means driven by said electrical stepper motor for driving said potentiometer.

8. The apparatus according to claim 7 wherein said generally horizontally extending member comprises:

an inner member; and an outer member, an end of said inner member being telescopically received in an end of said outer member, said end of said inner member and said end of said outer member having similar non-circular shapes, said inner member being adapted to transmit torque to said outer member without substantial backlash.

9. The apparatus according to claim 6 wherein said linkage mechanism further comprises:

a vertically extending member; and torque transfer means for transmitting torque from said generally horizontally extending member to said vertically extending member.

10. The apparatus according to claim 7 and further comprising:

means for reciprocating said needle, said electrical stepper motor and said linkage mechanism in unison along the longitudinal central axis of said needle independently of the adjustment of the position of said needle between its first and second positions.

11. The apparatus according to claim 9 wherein said vertically extending member comprises:

a rotatable member;

a non-rotatable member; and means for translating rotation of said rotatable member into reciprocation of said non-rotatable member.

12. The apparatus according to claim 11 and further comprising:

locking means for selectively permitting or preventing said non-rotatable member from reciprocating; and means operable at a third location remote from the position of said needle for operating said locking means.

13. The apparatus according to claim 12 wherein:

the first location remote from the position of said needle is a location accessible to a forming machine operator without the need to climb above the level of the forming machine;

the second location remote from the position of said needle is a location accessible to a forming machine operator without the need to climb above the level of the forming machine; and the third location remote from the position of said needle is a location accessible to a forming machine operator without the need to climb above the level of the forming machine.

14. In apparatus for feeding molten glass in a plurality of streams to a subjacent forming machine, the apparatus comprising a feeder bowl having an opening at a level at a level which will permit molten glass to flow by gravity therethrough and an orifice plate with a plurality of horizontally spaced apart orifices therein, the orifice plate being positioned below the feeder bowl in alignment with the opening, a needle assembly comprising:

a horizontally spaced apart plurality of generally vertically extending elongate needles, each of said needles being in alignment with one of the orifices and being movable independently of each other of said plurality of needles between first and second positions along its longitudinal central axis relative to the one of the orifices that said needle is in alignment with to control the rate of flow of molten glass through the one of the orifices;

means for detecting the position of each of said plurality of needles between its first and second positions and for indicating the position of each of said plurality of needles at a first location remote from said each of said plurality of needles; and means operable at a second location remote from the position of each of said plurality of needles for adjusting the position of said each of said plurality of needles between its first and second positions and independently of the position of each of the other needles of said plurality of needles.

15. The apparatus according to claim 14 wherein said means for adjusting comprises a plurality of electrical stepper motors, and a plurality of linkage mechanism means for independently transmitting motion from each of said electrical stepper motors to each of said plurality of needles.

16. The apparatus according to claim 15 wherein each of said plurality of electrical stepper motors is positioned remotely from the one of said plurality of needles with which it is operatively associated, and further comprising:

a plurality of linkage mechanism means for transmitting motion from said plurality of electrical stepper motors to said plurality of needles, each of said plurality of linkage mechanism means transmitting motion from one of said plurality of electrical stepper motors to the one of said plurality of needles with which said each of said plurality of electrical stepper motors is operatively associated.

17. The apparatus according to claim 16 wherein each of said linkage mechanism means comprises a generally horizontally extending member.

18. The apparatus according to claim 14 wherein the first location remote from the position of each of said plurality of needles is a location accessible by a forming machine operator without the need to climb above the level of the forming machine.

19. The apparatus according to claim 18 wherein the second location remote from the position of each of said plurality of needles is a location accessible by a forming machine operator without the need to climb above the level of the forming machine.

20. In an apparatus for feeding molten glass in a plurality of streams to a subjacent forming machine, the apparatus comprising a feeder bowl having an opening at a level which will permit molten glass to flow by gravity therethrough and an orifice plate with a plurality of horizontally spaced apart orifices therein, the orifice plate being positioned below the feeder bowl in alignment with the opening, the improvement including a needle assembly comprising:

a horizontally spaced apart plurality of generally vertically extending elongate needles, each of said needles being in alignment with one of a plurality of horizontally spaced apart orifices of a feeder bowl, and being movable independently of each other of said plurality of needles between first and second positions along a longitudinal central axis relative to the one of the orifices that said needle is in alignment with to control the rate of flow of molten glass through the orifices;

means operable at a location remote from the position of each of said plurality of needles for adjusting the position of said each of said plurality of needles between said first and second positions and independently of the position of each of the other needles of said plurality of needles, said means for adjusting comprises a plurality of electrical stepper motors, each of said plurality of needles being mechanically connected to one of said plurality of electrical stepper motors;

a plurality of linkage mechanism means mechanically connected to each of said plurality of needles and each of said plurality of stepper motors for transmitting motion from said plurality of electrical stepper motors to said plurality of needles, each of said plurality of linkage mechanism means comprises a generally horizontally extending member, movable in a circumferential direction; and means drivably connected to each of said plurality of stepper motors for detecting the position of each of said plurality of needles between said first and second positions relative to the circumferential motion of each of said plurality of linkage mechanism means and for indicating the position of each of said plurality of needles at a location remote from the position of said plurality of needles, said detecting means comprises a plurality of potentiometers.

21. The apparatus according to claim 20 wherein the generally horizontally extending member of each of said plurality of linkage mechanism means is connected to one of said plurality of potentiometers, and further comprising;

a plurality of endless drive means, each of said plurality of endless drive means drivingly connecting one of said plurality of electrical stepper motors to one of said plurality of potentiometers.

22. The apparatus according to claim 21 wherein each of the plurality of generally horizontally extending members comprises;

an inner member; and an outer member, an end of said inner member being telescopically received in an end of said outer member, said end of said inner member and said end of said outer member having similar non-circular shapes, said inner member being adapted to transmit torque to said outer member without substantial backlash.

23. The apparatus according to claim 22 wherein each of said plurality of linkage mechanism means further comprises:

a vertically extending member; and torque transfer means for transmitting torque from the generally horizontally extending member of said each of said linkage mechanism means to the vertically extending member of said each of said linkage mechanism means.

24. The apparatus according to claim 23 and further comprising:

means for reciprocating each of said plurality of said needles, each of said plurality of electrical stepper motors and each of said plurality of linkage mechanism means independently of the adjustment of the position of each of said plurality of needles between its first and second positions.

25. The apparatus according to claim 23 wherein said vertically extending member of each of said plurality of linkage mechanism means comprises:

a rotatable member;

a non-rotatable member; and means for translating rotation of said rotatable member into reciprocation of said non-rotatable member.

26. The apparatus according to claim 25 and further comprising:

a plurality of locking means, one of said plurality of locking means for each non-rotatable member of said plurality of linkage mechanisms, for selectively permitting or preventing each said non-rotatable member from reciprocating; and means operable at a third location remote from the position of each of said plurality of needles for operating each of said plurality of locking means.

* * * * *